United States Patent
Rothuizen et al.

(10) Patent No.: US 11,948,608 B2
(45) Date of Patent: Apr. 2, 2024

(54) MAGNETIC WRITE HEAD WITH FLUX BLOCKADE STRUCTURE

(71) Applicant: International Business Machines Corporation, Armonk, NY (US)

(72) Inventors: Hugo E. Rothuizen, Oberrieden (CH); Icko E. T. Iben, Santa Clara, CA (US); Robert Fontana, San Jose, CA (US); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/681,454

(22) Filed: Feb. 25, 2022

(65) Prior Publication Data

US 2023/0154488 A1    May 18, 2023

Related U.S. Application Data

(60) Provisional application No. 63/278,647, filed on Nov. 12, 2021.

(51) Int. Cl.
*G11B 5/187* (2006.01)

(52) U.S. Cl.
CPC .................................. *G11B 5/1871* (2013.01)

(58) Field of Classification Search
None
See application file for complete search history.

(56) References Cited

U.S. PATENT DOCUMENTS

| | | | |
|---|---|---|---|
| 4,907,113 A | 3/1990 | Mallary | |
| 5,225,033 A * | 7/1993 | Ogura | G11B 5/1871 216/48 |
| 6,751,052 B1 | 6/2004 | Tagawa et al. | |
| 7,343,664 B2 | 3/2008 | Khera et al. | |
| 8,498,079 B1 * | 7/2013 | Song | G11B 5/315 360/125.3 |
| 9,361,912 B1 * | 6/2016 | Liu | G11B 5/3163 |
| 10,650,848 B2 | 5/2020 | Biskeborn et al. | |
| 11,373,676 B1 * | 6/2022 | Fontana | G11B 5/1278 |
| 2005/0141137 A1 * | 6/2005 | Okada | G11B 5/11 |
| 2007/0103813 A1 | 5/2007 | Khera et al. | |
| 2007/0247748 A1 * | 10/2007 | Ikeda | G11B 5/667 |
| 2008/0151436 A1 * | 6/2008 | Sato | G11B 5/3123 |
| 2012/0262824 A1 * | 10/2012 | Jubert | G11B 5/3116 |
| 2018/0247663 A1 * | 8/2018 | Biskeborn | G11B 5/3153 |
| 2018/0247668 A1 * | 8/2018 | Biskeborn | G11B 5/265 |
| 2018/0366147 A1 * | 12/2018 | Biskeborn | G11B 5/3116 |
| 2019/0180774 A1 * | 6/2019 | Biskeborn | G11B 5/3116 |
| 2019/0180775 A1 * | 6/2019 | Biskeborn | G11B 5/1871 |
| 2019/0251992 A1 * | 8/2019 | Ho | G11B 5/235 |

* cited by examiner

*Primary Examiner* — William J Klimowicz
(74) *Attorney, Agent, or Firm* — Zilka-Kotab, P.C.

(57) ABSTRACT

An apparatus such as a device having a writer for magnetic media has a trailing pole piece having a portion adjacent a write gap, the portion having a throat height (h1) of between about 100 and about 800 nm, and an aspect ratio of thickness/throat height (t1/h1) in a range of 0.5 and 2.

17 Claims, 15 Drawing Sheets

MAGNETIC WRITE HEAD WITH FLUX BLOCKADE STRUCTURE

BACKGROUND

The present invention relates to data storage systems, and more particularly, this invention relates to magnetic write heads having a structure that improves colocation of the write bubble and regions of high write field gradient, as well as increases the strength of write field gradients.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to decreasing the width of the written data track and increasing the linear bit density on recording tape, and increasing the length of the data tape, which involves decreasing the thickness of the magnetic tape medium to maintain a similar volume occupied by the tape medium. However, the development of small footprint, higher performance tape drive systems has created various challenges ranging from the design of tape head assemblies for use in such systems to dealing with tape dimensional instability.

The width of the written bit in magnetic tape recording is formed by a process called shingling. Transitions are first written at a larger width using the trailing edge of a write head pole structure during the first pass of a write head down the tape. When the write head makes a second pass down the tape, the head is translated an amount "w" so that the initial width of the written transition is trimmed to a final width "w", also known as the "track pitch". This trimming is referred to as "shingling". Decreasing the track pitch to increase system capacity involves decreasing "w" while maintaining optimal sensing characteristics of the written track. Ideally, the shape of the written transition should be as uniform (i.e., as "straight") as possible within the lateral span "w" of the remanent track, while the lateral edge of the written transition should be as abrupt as possible. These requirements are difficult to achieve in practice due to the inherent smoothness of fringing magnetic fields. Still, an approximation of the ideal (discontinuous) three dimensional (3D) write field shape can be obtained by laterally shaping and aligning the trailing and leading pole pieces of a "ring"-type write head. Typically, in a current state of the art writer, the lateral faces of the trailing pole piece (P2) are near-vertical over its entire down-track length of typically 2-4 μm, this feature providing for the abrupt edge of track, and the lateral faces of the leading pole piece (P1) are in the prolongation of the those of P2, extending from the write gap to a minimal length (notch depth of ~300 nm); this feature serves to suppress side writing by the leading pole.

Besides shaping the write field laterally in this way, another important characteristic which affects how much of the shingled track width "w" is, in practice, usable for recording is the (down-track) quality of the written transition. Importantly, an improvement in write quality (i.e., better signal to noise ratio (SNR) performance) across the width of the written track also translates to an increase in "usable track width" (or tracking margin, as reference to a fixed level of SNR).

Both the magnitude of the effective write field and the field gradient are key parameters that work together to achieve good write quality. More specifically, as the current applied to the writer is increased and the effective write field "bubble" expands to intersect the magnetic media layer, the location of the maximum of the field gradient (which is also a surface in 3D space) should ideally remain spatially coincident with the expanding write bubble in order to imprint the media with the smallest possible transition parameter ("a-parameter") and thereby obtain optimum write quality and SNR performance. In the current state of the art, this condition is imperfectly met because the shapes and rates of expansion of the write bubble and of the "max gradient bubble" are different. The size and shape of the write bubble depends strongly on the properties of the media (Hk), whereas the shape of the gradient bubble depends mostly on the shape of the saturation pattern in the write poles, which is dependent on the geometry of the writer alone. Hence, for a given writer geometry and a media with specific properties, the writer and media parts of the system are at best "well-tuned" to each other, in terms of their degree of bubble colocation, over a limited range of write currents.

Unfortunately, the specific properties of the media that will ultimately be used with a given writer are rarely, if ever, known.

SUMMARY

An apparatus, in accordance with one embodiment, includes a writer for magnetic media has a trailing pole piece having a portion adjacent a write gap, the portion having a throat height (h1) of between about 100 and about 800 nm, and an aspect ratio of thickness/throat height (t1/h1) in a range of 0.5 and 2.

An apparatus, in accordance with another embodiment, includes a trailing pole piece having a portion adjacent a write gap. The portion has an aspect ratio of thickness/throat height (t1/h1) in a range of 0.5 and 2. The trailing pole piece includes a flare-out extending in a cross-track direction, lower surfaces of the flare-out being oriented at an angle (a1) from the cross-track direction, the angle (a1) being in a range of from 0 to about 60 degrees.

The various embodiments disclosed herein may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Some embodiments include a writer having a trailing pole piece with a geometry, referred to herein as a flux blockade structure, that modifies, and to some extent allows adjustment of, the shape of the saturation pattern that forms in the pole as the write current is ramped up to operating levels. For writing high-coercivity media formulations, this provides a way to improve colocation and also the strength of the write field gradients, and hence improve write quality and tracking margin.

In one general embodiment, an apparatus includes a writer for magnetic media has a trailing pole piece having a portion adjacent a write gap, the portion having a throat height (h1) of between about 100 and about 800 nm, and an aspect ratio of thickness/throat height (t1/h1) in a range of 0.5 and 2.

In one general embodiment, an apparatus includes a trailing pole piece having a portion adjacent a write gap. The portion has an aspect ratio of thickness/throat height (t1/h1) in a range of 0.5 and 2. The trailing pole piece includes a flare-out extending in a cross-track direction, lower surfaces of the flare-out being oriented at an angle (a1) from the cross-track direction, the angle (a1) being in a range of from 0 to about 60 degrees.

Figure 1A:
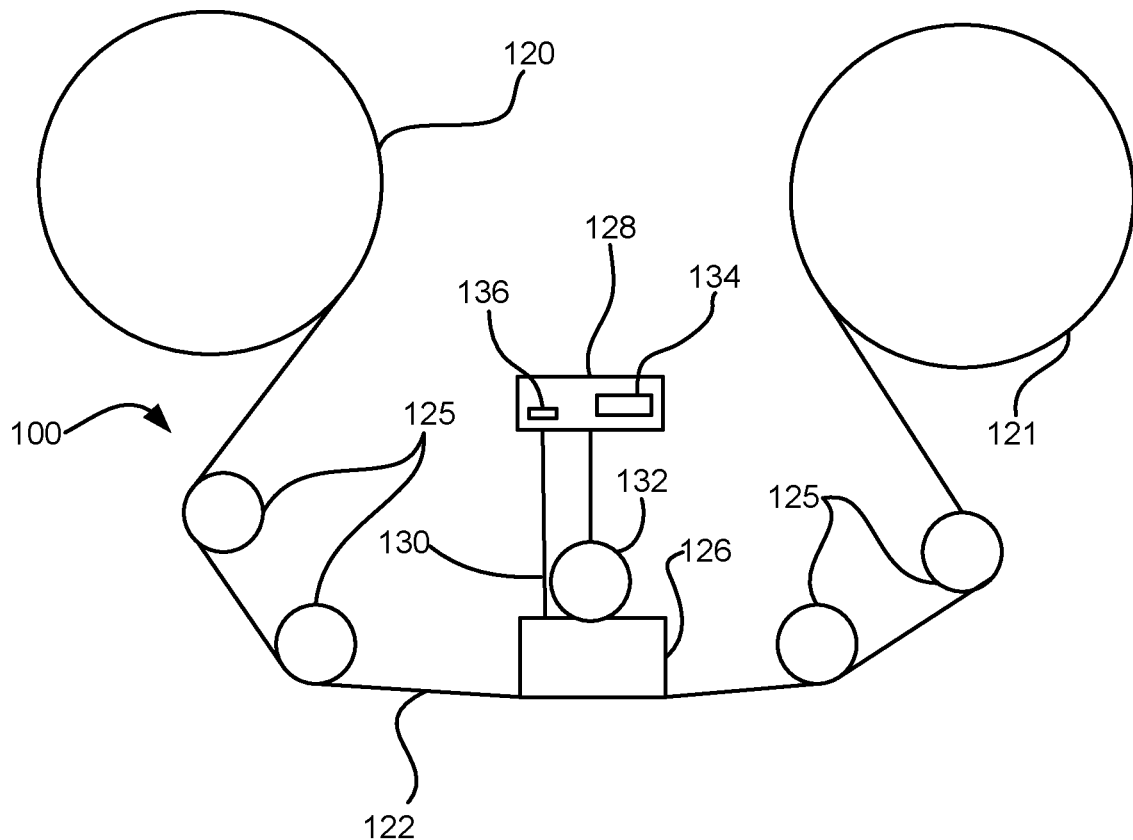
FIG. 1A is a schematic diagram of a simplified tape drive system, in accordance with one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
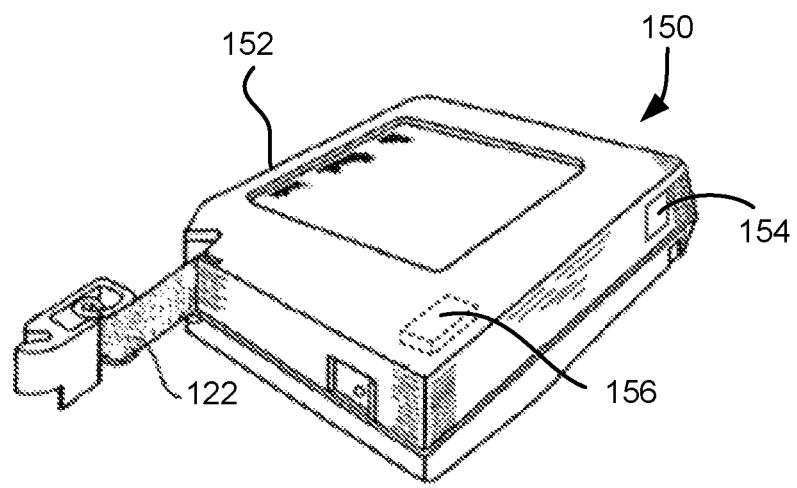
FIG. 1B is a schematic diagram of a tape cartridge, in accordance with one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
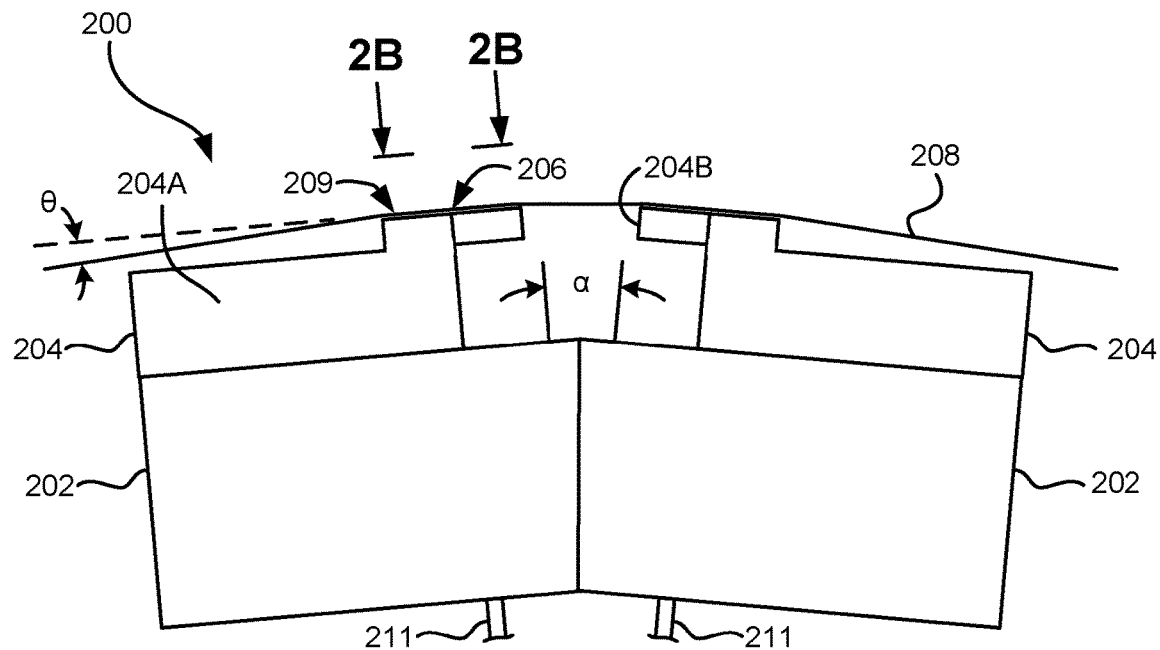
FIG. 2A illustrates a side view of a flat-lapped, bi-directional, two-module magnetic tape head, in accordance with one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 211 are provided for enabling communication between the controller and the transducers 206 of each of the modules 204. Pads on a cable 211 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
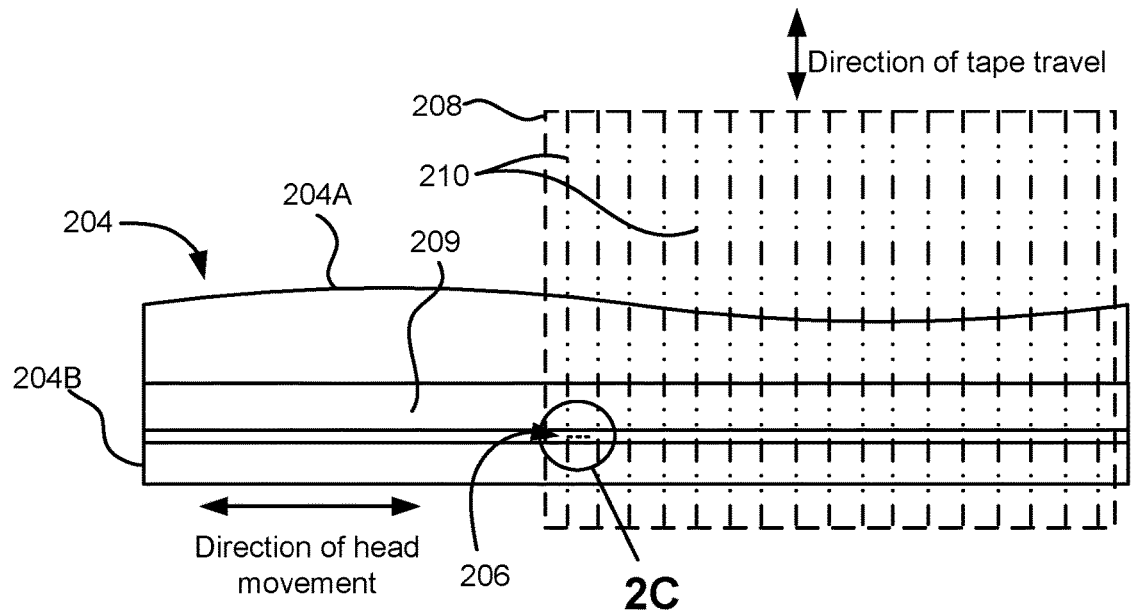
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
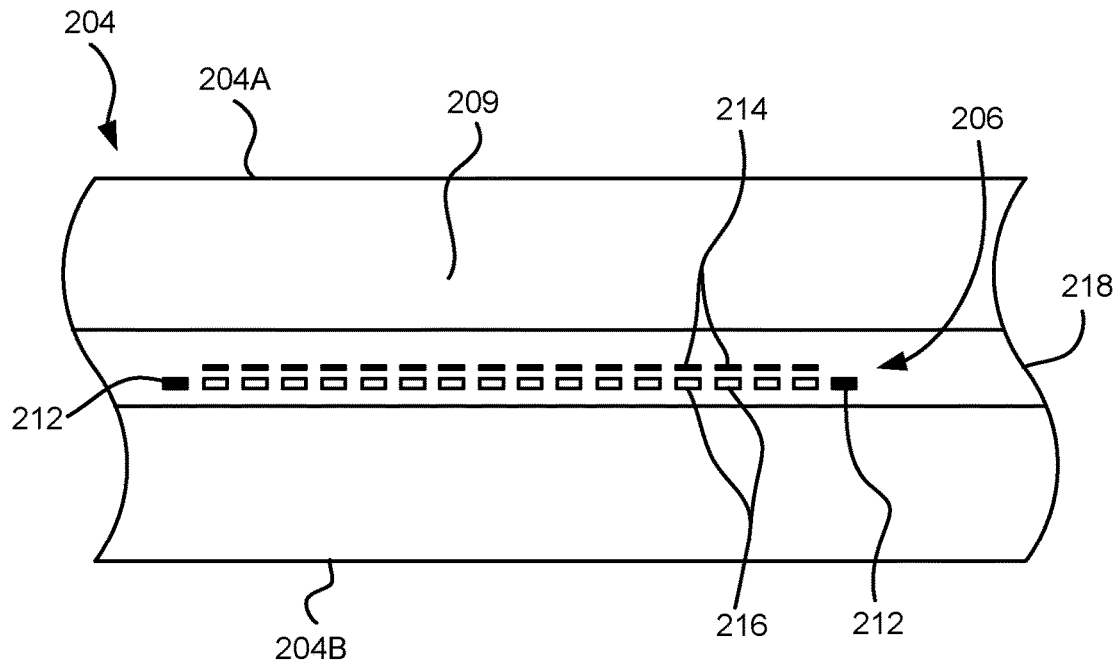
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
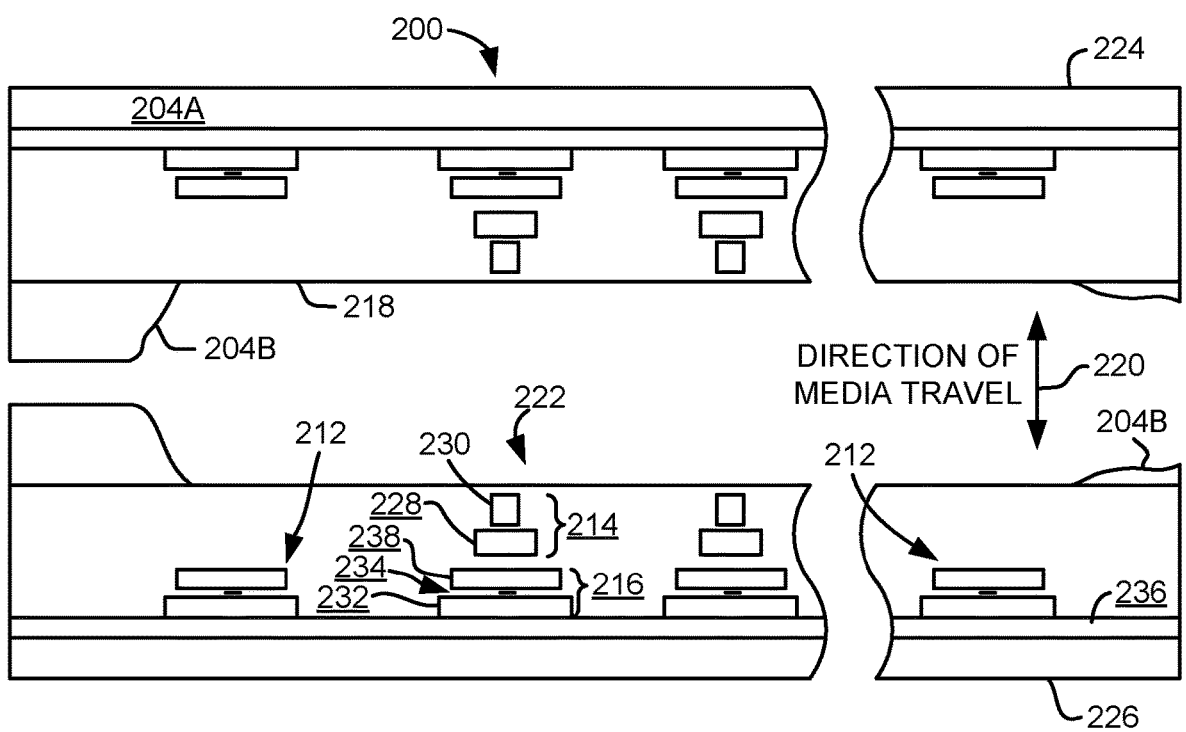
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of RAY pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the RAY pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
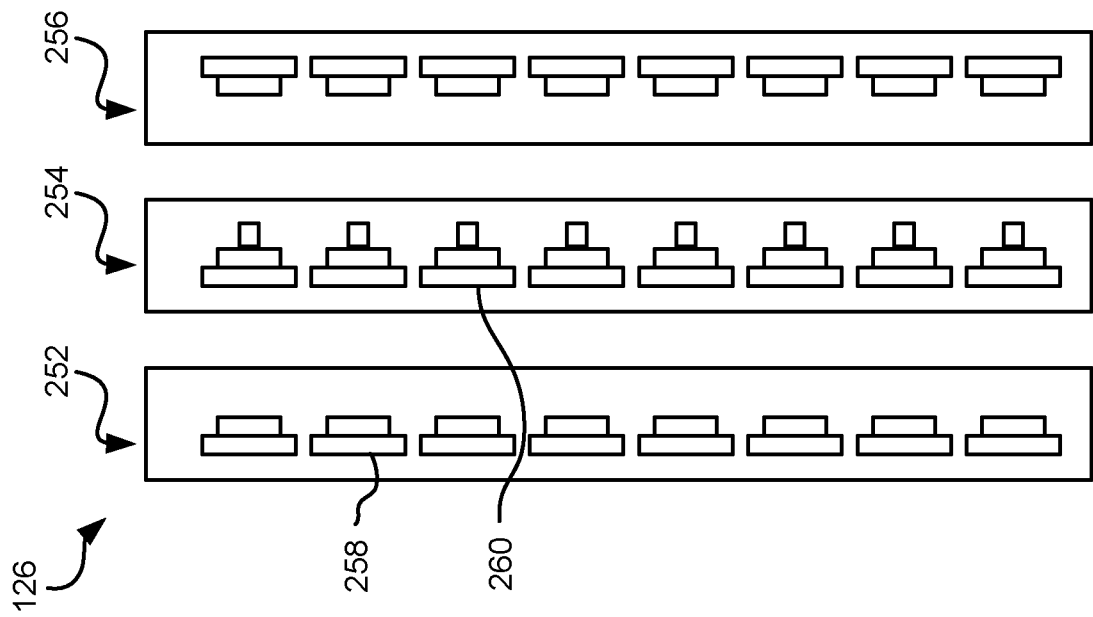
FIG. 4 is a partial tape bearing surface view of a magnetic head having a read-write-read configuration, in accordance with one embodiment.
Figure 3:
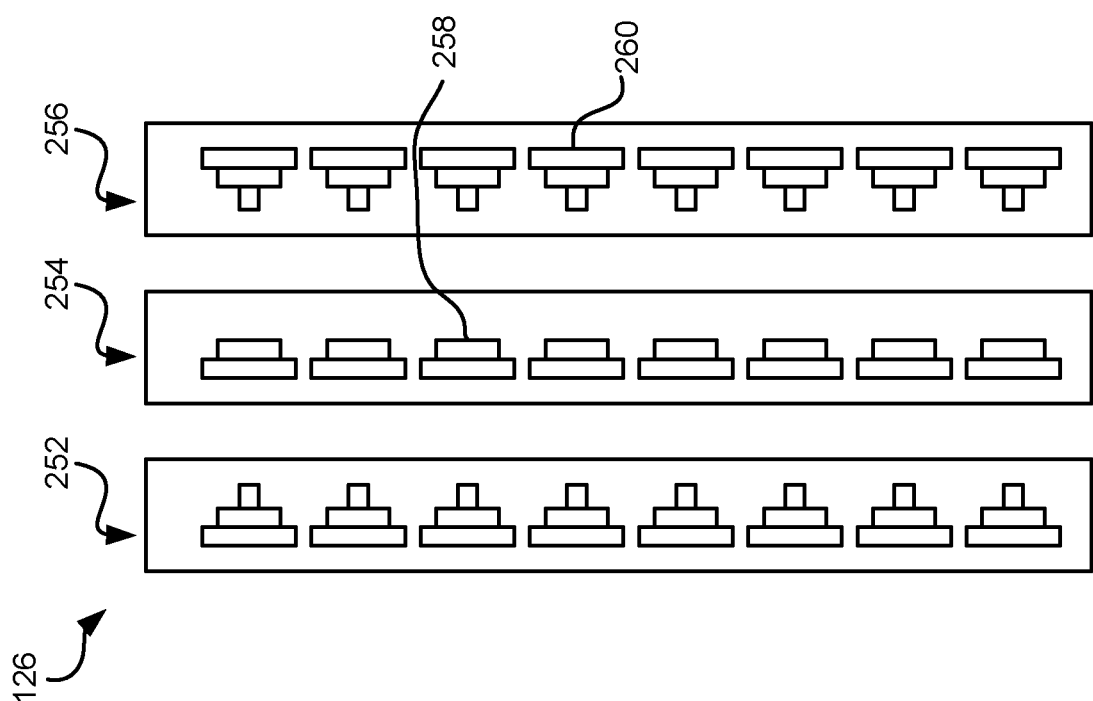
FIG. 3 is a partial tape bearing surface view of a magnetic head having a write-read-write configuration, in accordance with one embodiment.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
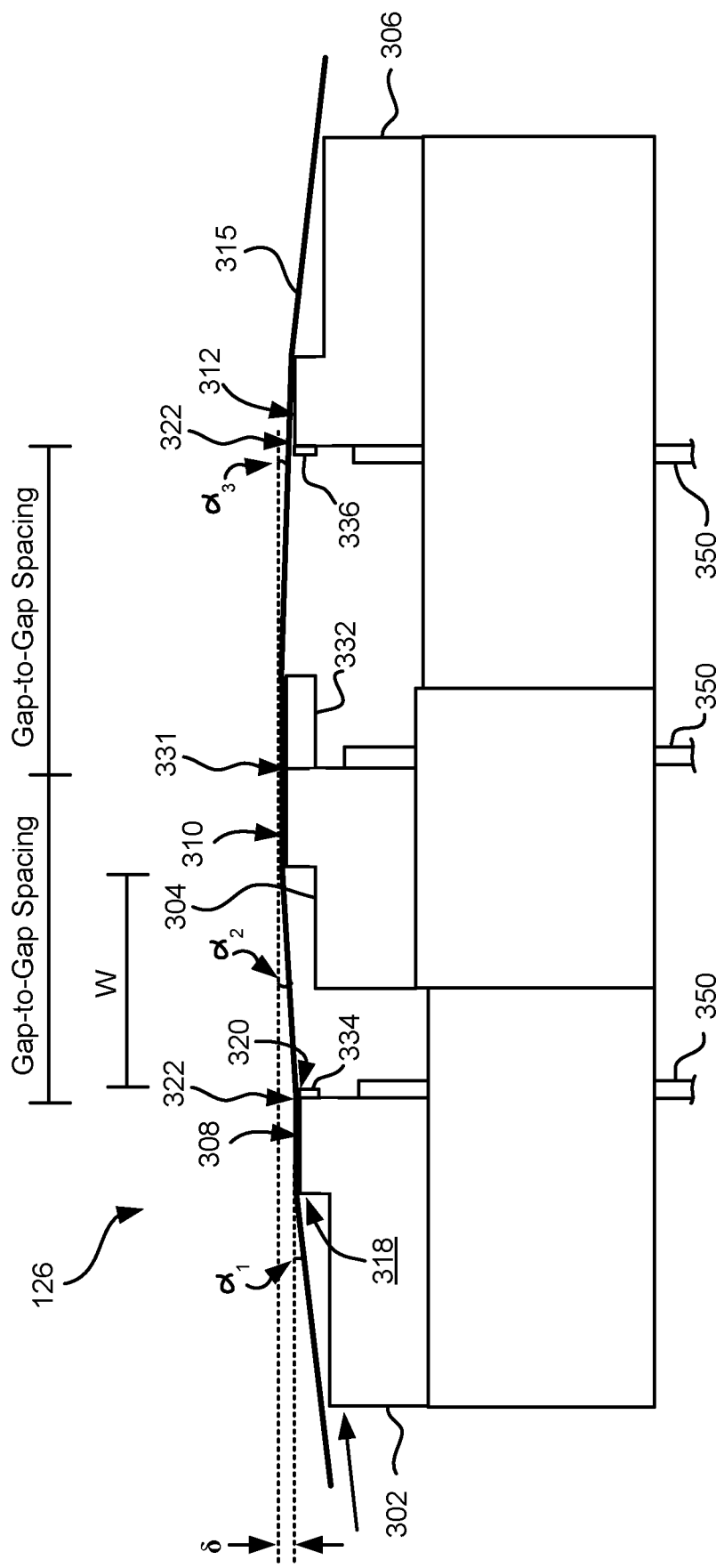
FIG. 5 is a side view of a magnetic tape head with three modules according to one embodiment where the modules all generally lie along about parallel planes, in accordance with one embodiment.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
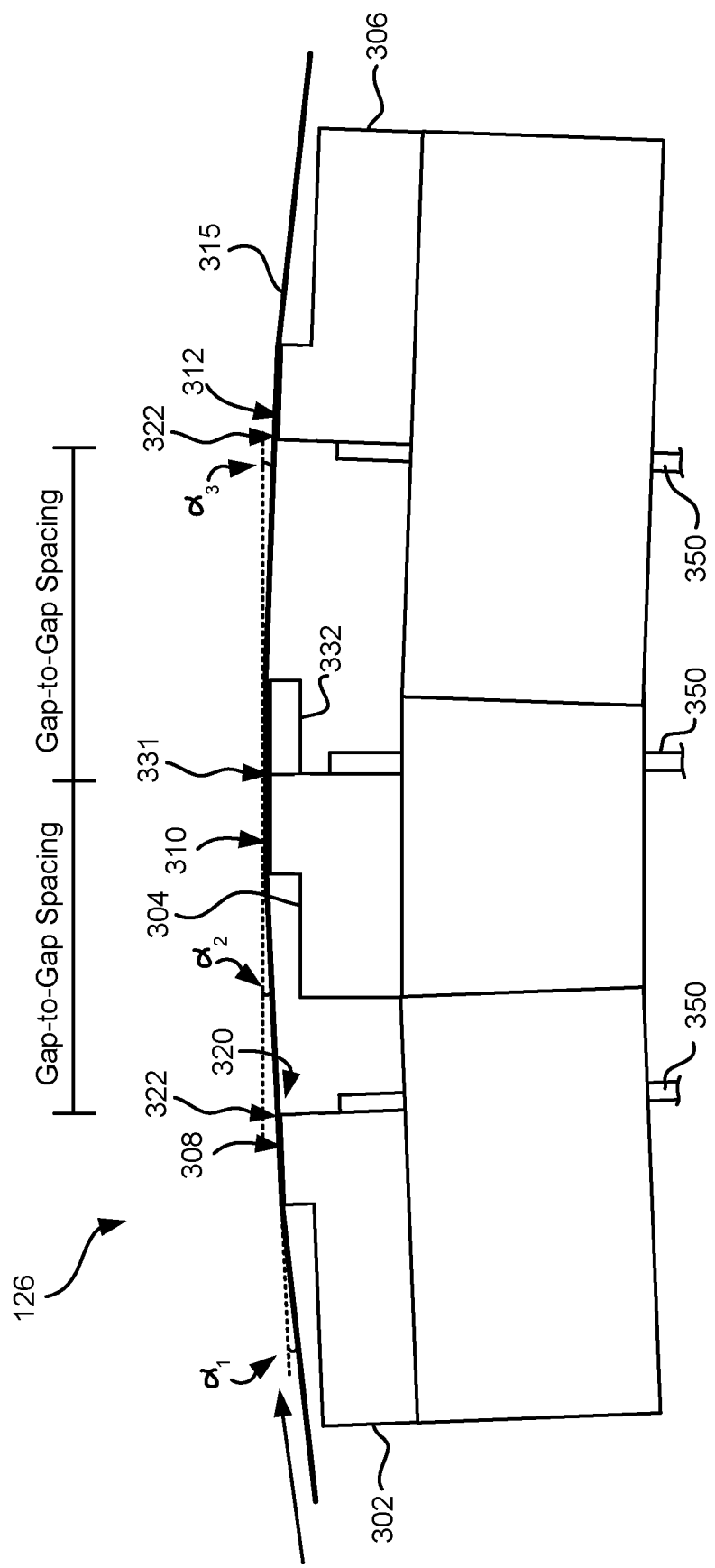
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
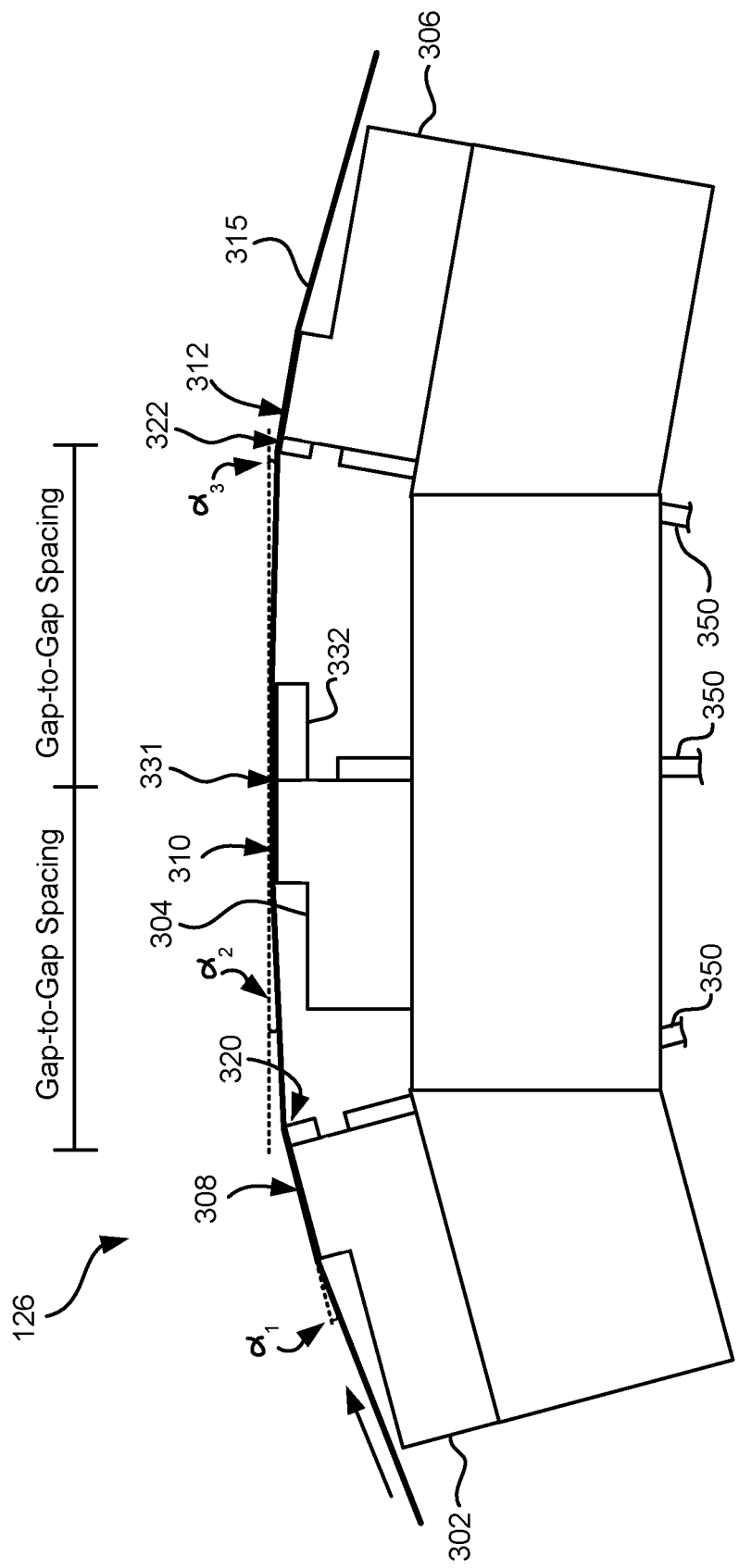
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
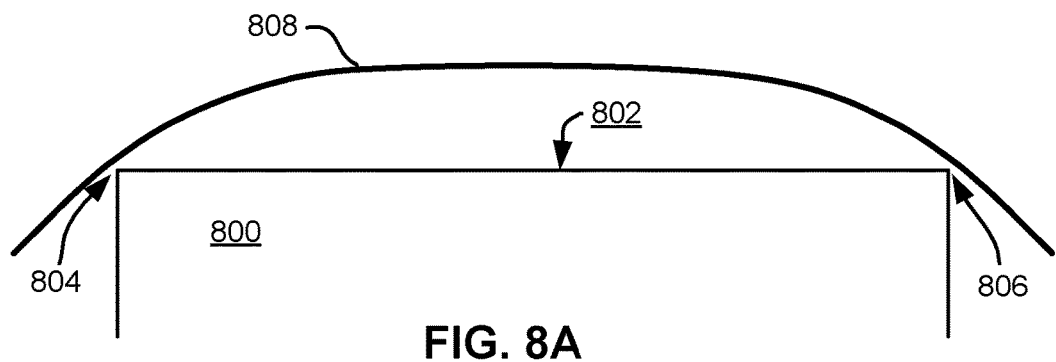
FIGS. 8A-8C are schematics depicting the principles of tape tenting.
Figure 8B:
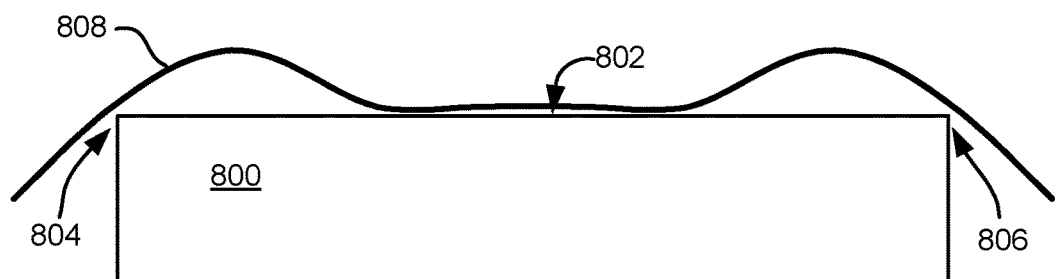
Figure 8C:
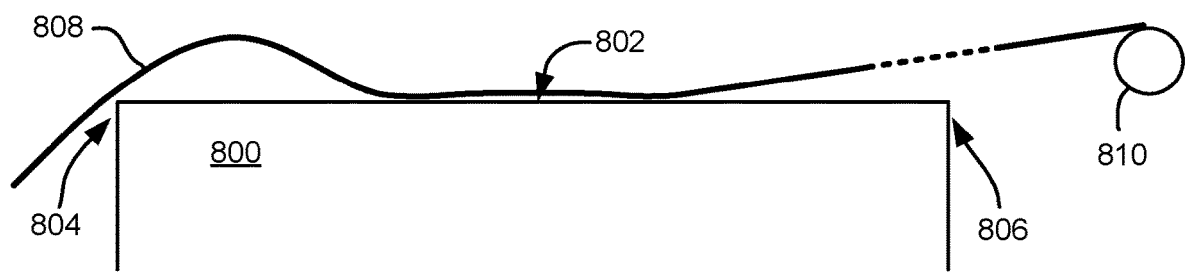

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804,

806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge, and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
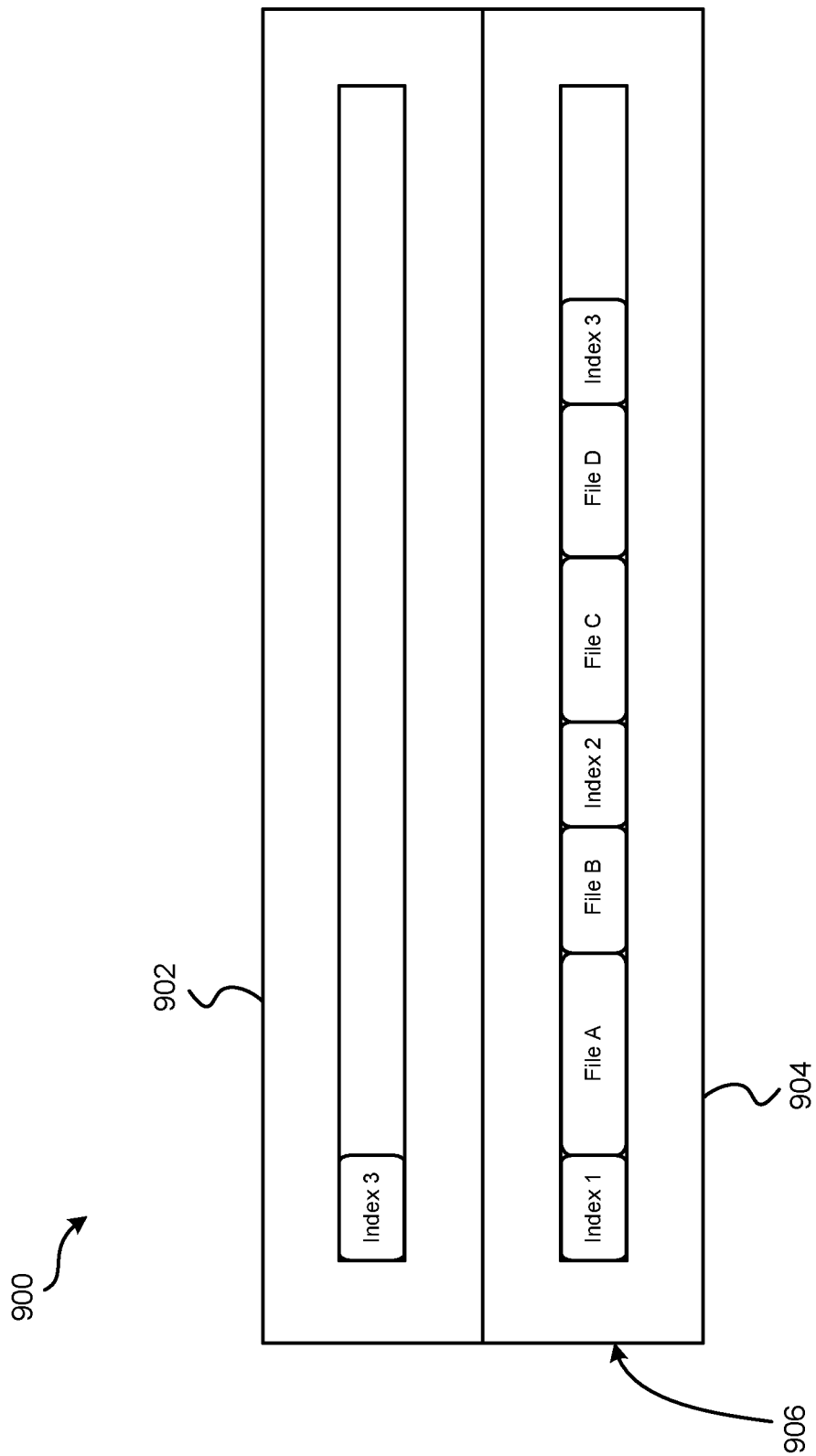
FIG. 9 is a representational diagram of files and indexes stored on a magnetic tape, in accordance with one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above, a continuing goal of the industry is to improve write quality. The magnitude of the effective write field and the field gradient are parameters that affect write quality. Both parameters, if properly created, result in good write quality.

According to various embodiments, magnetic writer structures have a new and novel geometry of the trailing pole piece of the writer, referred to herein as a flux blockade structure, that modifies, and to some extent allows adjustment of, the shape of the saturation pattern that forms in the pole as the write current is ramped up to operating levels. For writing high-coercivity media formulations, this provides a way to improve colocation and also the strength of the write field gradients, and hence improves write quality and tracking margin.

In one approach, the magnetic writer structure is configured to magnetically "float" the portion of the trailing pole which actually writes the media (e.g., the high moment region directly adjacent to the write gap from which the write bubble develops), by limiting the physical extent of the trailing pole in the height direction (perpendicular to the tape bearing surface (TBS)) and by shaping the along-track-direction flux path which feeds it with a geometric constriction, or "bottleneck," such that when the write current is ramped up sufficiently, a saturation "plug" or "blockade" forms in this lower-moment region across the entire cross-section of the flux path. This adds a high reluctance region in series and provides a degree of isolation to the writing portion of the pole that is somewhat adjustable through the length and shape of the constriction. As a consequence, the shape of the magnetization pattern which develops in this portion of the pole when the write current is ramped up yet further is determined more by the geometry of its immediate magnetostatic environment (e.g., its own shape, the width of the write gap, and the shape of the leading pole), than by the reluctance of its flux-path link to the yoke. The pole is less forcefully driven than with the state of the art (SOA) configuration, and thus goes less deep in saturation, producing stronger write field gradients in the vicinity of the write gap and changing the relative rates of expansion of the write bubble and the gradient bubble.

Modeling shows that for a typical high-coercivity media studied by the inventors, colocation is improved at practical write currents. In addition, the layer thickness of the high moment portion of the pole, when changed, also influences the relative rates of expansion, and thus provides another way to tune colocation. For example, a thicker high moment layer will slow the rate of expansion of the write bubble while leaving the shape of the gradient field comparatively unaffected.

Figure 10:
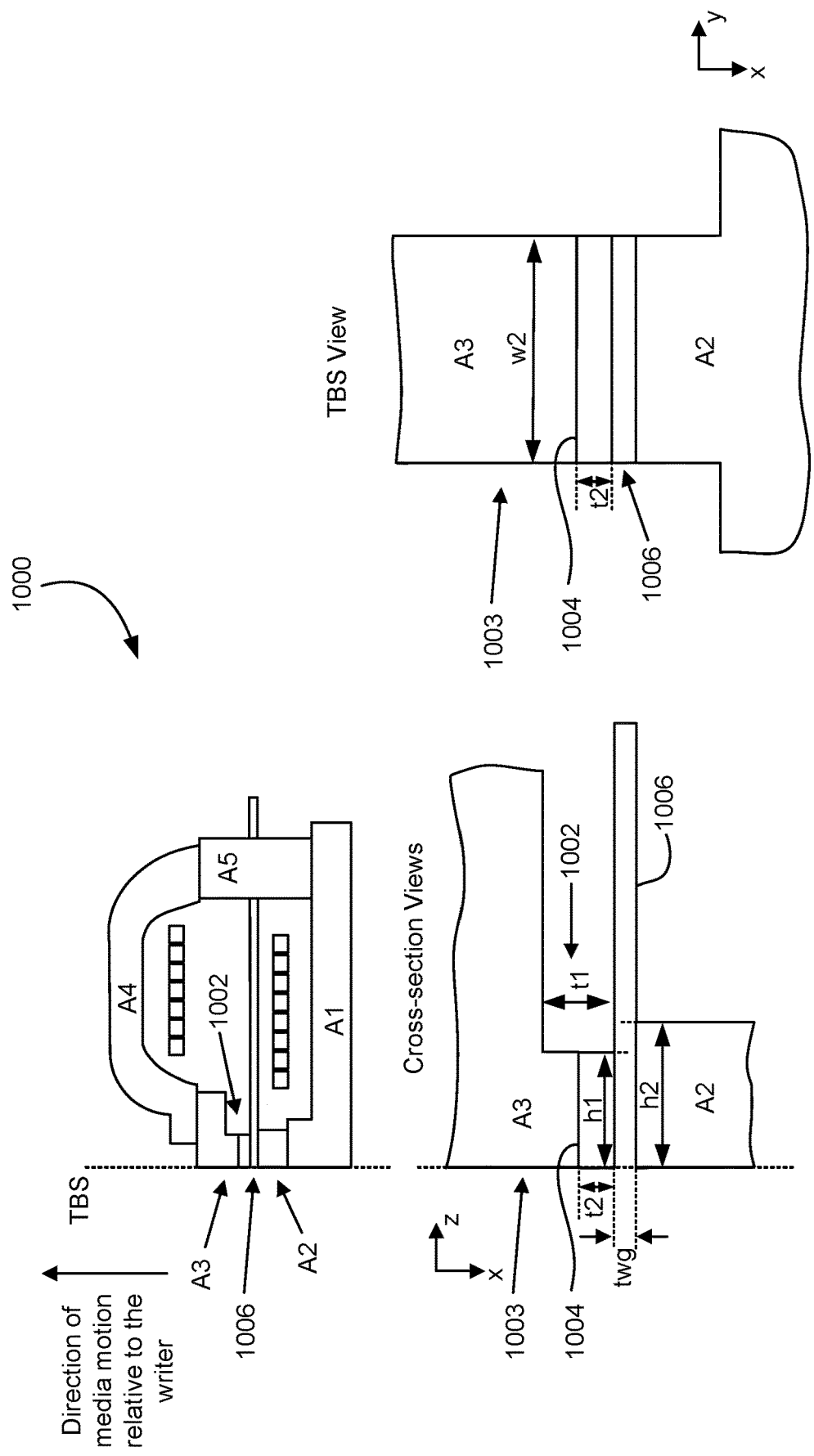
FIG. 10 includes a cross-sectional view, detailed cross-sectional view, and a tape bearing surface (TBS) view of a writer, in accordance with one embodiment.

FIG. 10 depicts a writer 1000 having a trailing pole piece A3 with a flux blockade structure 1002, in accordance with one embodiment. As an option, the present writer 1000 may be implemented in conjunction with features from any other embodiment listed herein, such as those described with reference to the other FIGS. Of course, however, such writer 1000 and others presented herein may be used in various applications and/or in permutations which may or may not be specifically described in the illustrative embodiments listed herein. Further, the writer 1000 presented herein may be used in any desired environment.

The flux blockade structure 1002 is a portion of the trailing pole piece A3 adjacent the write gap. The portion is characterized by a stud-like shape, e.g., a substantially rectangular shape in cross-section as measured along the direction of media motion relative to the writer 1000, with an aspect ratio t1/h1 in a range of 0.5 to 2.0, preferably about 0.7 to about 1.1, and in some approaches about 0.9. The trailing pole piece A3 preferably has a throat height h1 that is less than a throat height h2 of the leading pole piece A2. In some approaches, h1 may be in a range of h1=100 nm to 800 nm, preferably about 300-500 nm, and in some approaches about 400 nm. The stud 1003 is layered, with the higher-moment region 1004 positioned adjacent to the write gap 1006 acting as the writing pole (in the sense that it is the source of flux lines fringing out and intersecting the media). The flux path feeding this writing pole from the upper yoke A4 is constrained geometrically to go down the stud 1003, rather than to come mostly from the back as in conventional structures. Flux is thus forced through the uppermost portion of the stud 1003 where the combined geometric constriction and lower moment result in the formation of a saturated region spanning the full cross-section of the flux path (the blockade).

The higher-moment region 1004 preferably is comprised of a material having a higher magnetic moment (e.g., magnetic moment of the bulk material forming the higher-moment region 1004 as a whole) than the (bulk) material of the flux blockade structure 1002 portion of the trailing pole piece, and ideally higher than the magnetic moment of the remainder of the trailing pole piece A3, to promote the formation of the blockade. Further, a higher magnetic moment correlates to a greater strength of the write field, so it is desirable for the higher-moment region 1004 to have as high a magnetic moment as possible to enhance the strength of the write field fringing out of the gap and to enable writing to higher coercivity media. Accordingly, the material of the higher-moment region 1004 has a value of saturation magnetization, Bs, of at least 1.9 T, but preferably equal or greater to 2.0 T. The higher-moment region 1004 may include an alloy of iron and one or more metals selected from the group consisting of cobalt, nickel, aluminum and platinum. Exemplary higher moment materials include cobalt-iron-nickel and cobalt-iron alloys; high concentration iron-nickel alloys, e.g., such as 78% iron-22% nickel; etc. In some approaches the higher-moment region 1004 may include other metals therein.

The layer thickness t2 of the higher-moment region 1004 is in a range between a minimum of about 50 nm up to the full thickness of the stud (t1). From a fabrication standpoint, the stud feature may be realized by inserting a small number of additional steps in a standard fabrication sequence, for example including a lithography, a sputtering and/or plating deposition, and a CMP step, in a manner that would become apparent to a person skilled in the art upon being apprised of the present disclosure.

The remaining portions of the writer 1000, such as the leading pole piece A2, lower yoke A1, back yoke A5, upper yoke A4, coils, etc. may be of conventional construction and relative dimensions. The thickness twg of the write gap may be any suitable value, e.g., a thickness selected to optimize writing based on the magnetic media parameters and desired linear density as would be selectable by one skilled in the art upon reading the present disclosure. Moreover, in the embodiment shown in FIG. 10, the width w2 of the trailing pole piece A3 as measured in the cross-track direction (y direction) is constant along the trailing pole piece A3 in the direction of media motion relative to the trailing pole piece and writer.

Those skilled in the art, armed with the present teachings, will appreciate that known methods of manufacturing magnetic heads may be adapted for use in constructing the writers described hereinabove and below. Moreover, unless otherwise specified, processes and materials of types known in the art may be adapted for use in various embodiments in conformance with the teachings herein, as would become apparent to one skilled in the art upon reading the present disclosure.

Figure 11:
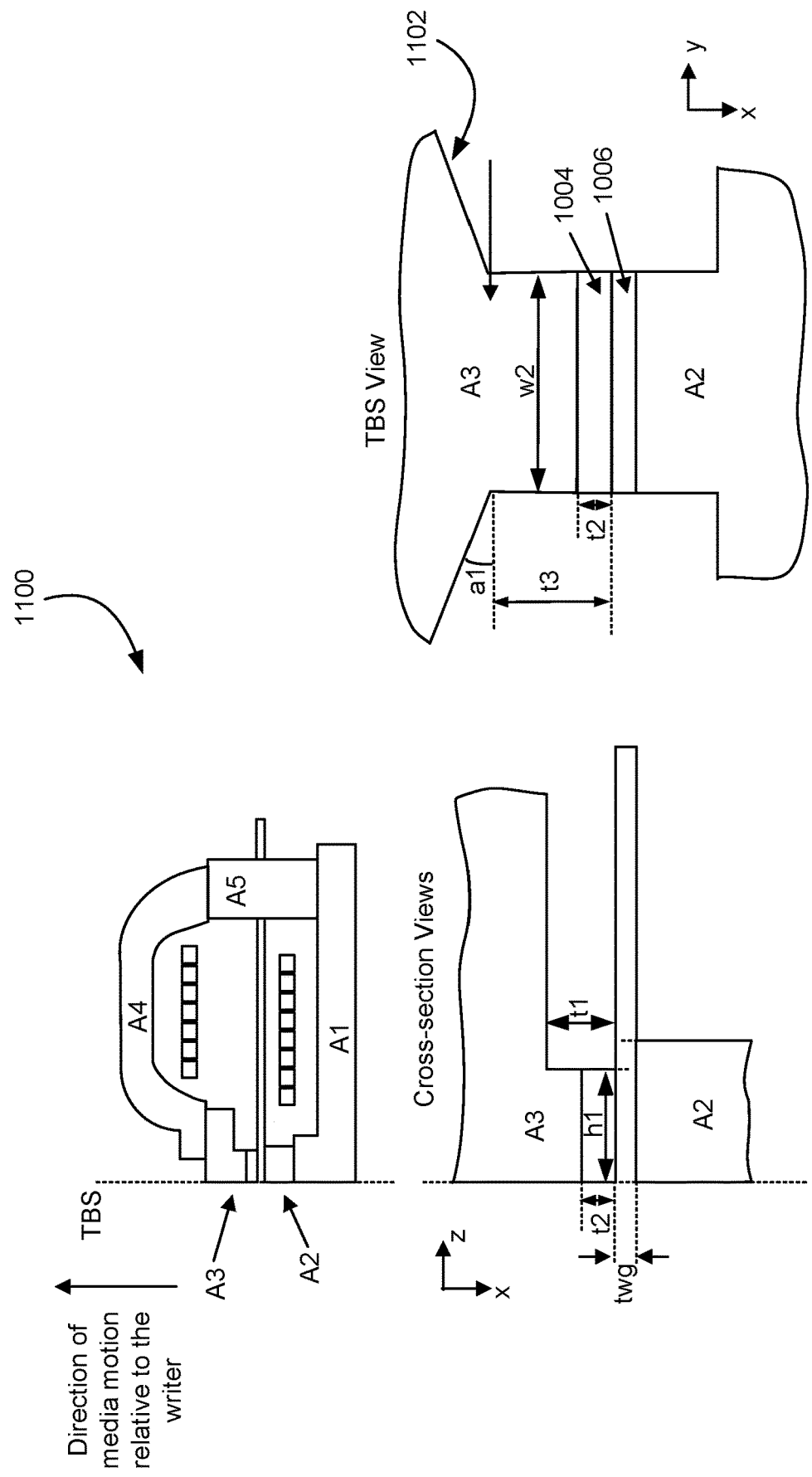
FIG. 11 includes a cross-sectional view, detailed cross-sectional view, and a TBS view of a writer, in accordance with one embodiment.

FIG. 11 depicts a writer 1100 having a flux blockade structure, in accordance with one embodiment. As an option, the present writer 1100 may be implemented in conjunction with features from any other embodiment listed herein, such as those described with reference to the other FIGS. Of course, however, such writer 1100 and others presented herein may be used in various applications and/or in permutations which may or may not be specifically described in the illustrative embodiments listed herein. Further, the writer 1100 presented herein may be used in any desired environment.

The writer 1100 has similar features as the writer 1000 of FIG. 10, but includes an additional lateral flare-out 1102 of the width w2 of the trailing pole piece A3 in the cross-track direction (y direction) starting at some distance, t3, (further defined below), above the top edge of the gap material. The flare-out serves to reduce the reluctance of the flux path feeding the pole piece A3. This improves head efficiency, and also provides a further mechanism for adjusting the saturation pattern in the writing portion of the pole via the choice of the neck length t3 and the flare angle a1. Decreasing either t3 or a1 (or both) has the effect of making the shape of the write field fringing out from the gap more uniform across the width w2 of the writer, producing straighter transitions in the media and thereby increasing the proportion of the written track width that is usable for recording. The neck length t3 is in a range of 200 nm to 800 nm, preferably 300 nm to 500 nm, and in some approaches about 400 nm. The flare angle a1 between the lower surface of a flare-out and the cross-track direction is in a range of 0 degrees to 60 degrees, more preferably 0 degrees to 50 degrees, in some approaches greater than 0 degrees to 50 degrees, and in some approaches 15 degrees to 35 degrees.

For the fabrication of a pole with non-zero flare angle a1, known techniques such as angled reactive ion etching, or greyscale lithography followed by normal-incidence reactive ion etching of a non-magnetic spacer layer may be used to obtain the sloped sides of the plating base from which the flared portion of the pole is plated up.

The neck length t3 may be the same as, greater than, or less than t1 in various approaches. The special case of an embodiment with a1=0 degrees and t3=t1, i.e., the lateral flare is planar and extends without discontinuity towards the back, is straightforward to fabricate using similar methods as for the stud feature mentioned above.

Figure 12:
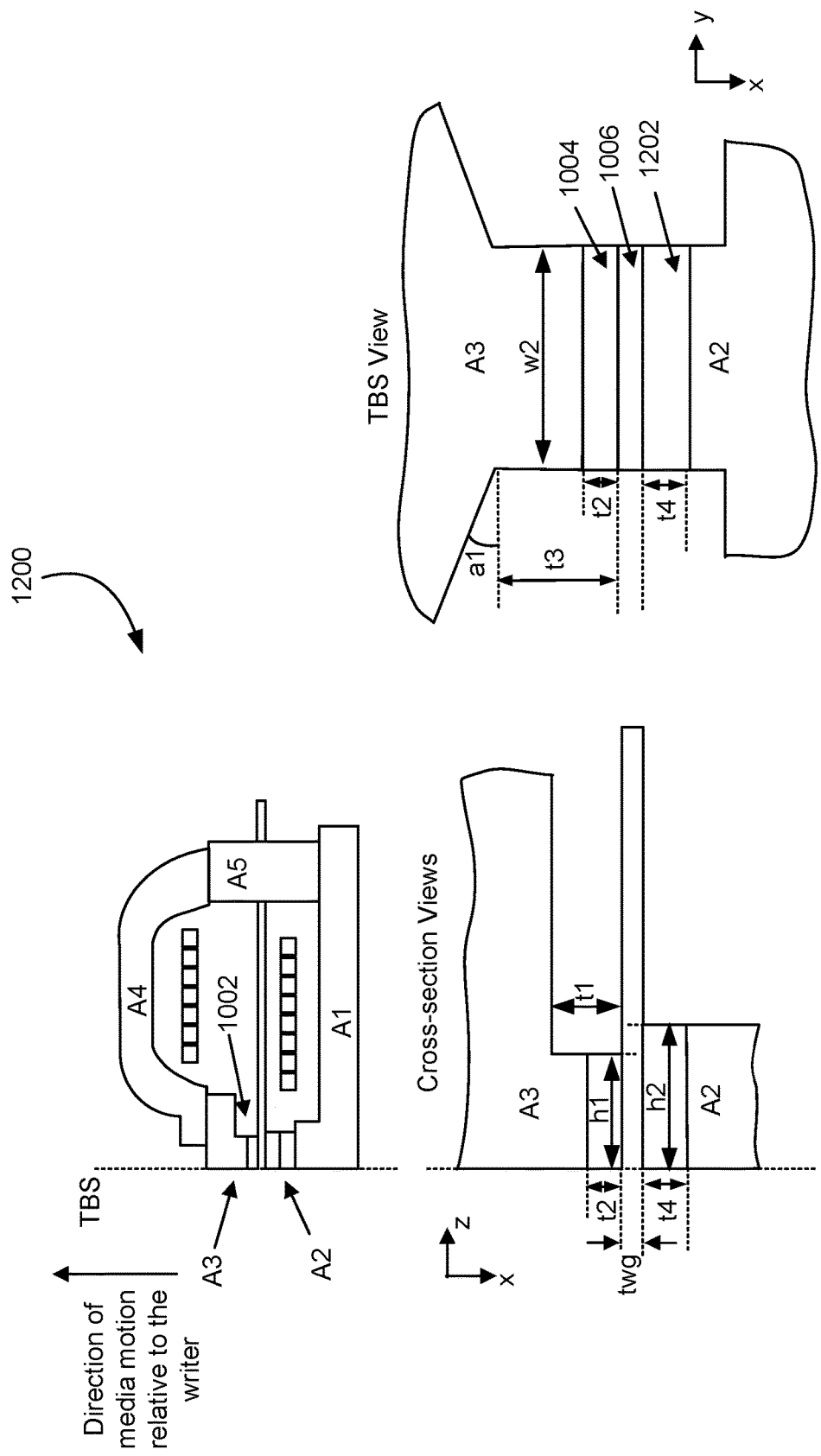
FIG. 12 includes a cross-sectional view, detailed cross-sectional view, and a TBS view of a writer, in accordance with one embodiment.

FIG. 12 depicts a writer 1200, in accordance with one embodiment, in which the leading pole piece A2 is topologically similar to the trailing pole piece A3, including a higher-moment material region 1004 positioned adjacent to the write gap 1006. As an option, the present writer 1200 may be implemented in conjunction with features from any other embodiment listed herein, such as those described with reference to the other FIGS. Of course, however, such writer 1200 and others presented herein may be used in various applications and/or in permutations which may or may not be specifically described in the illustrative embodiments listed herein. Further, the writer 1200 presented herein may be used in any desired environment.

As shown in FIG. 12, the leading pole piece A2 is topologically similar to the trailing pole piece A3, including a higher-moment material region 1202 positioned adjacent to the write gap and having a thickness t4 in a range between a minimum of about 50 nm up to about 800 nm, and a throat height h2 comparable to, or preferably slightly larger than, the throat height h1 of the trailing pole (range h2=100 nm to 800 nm, preferably about 350-700 nm, and in some approaches about 600 nm).

Figure 13:
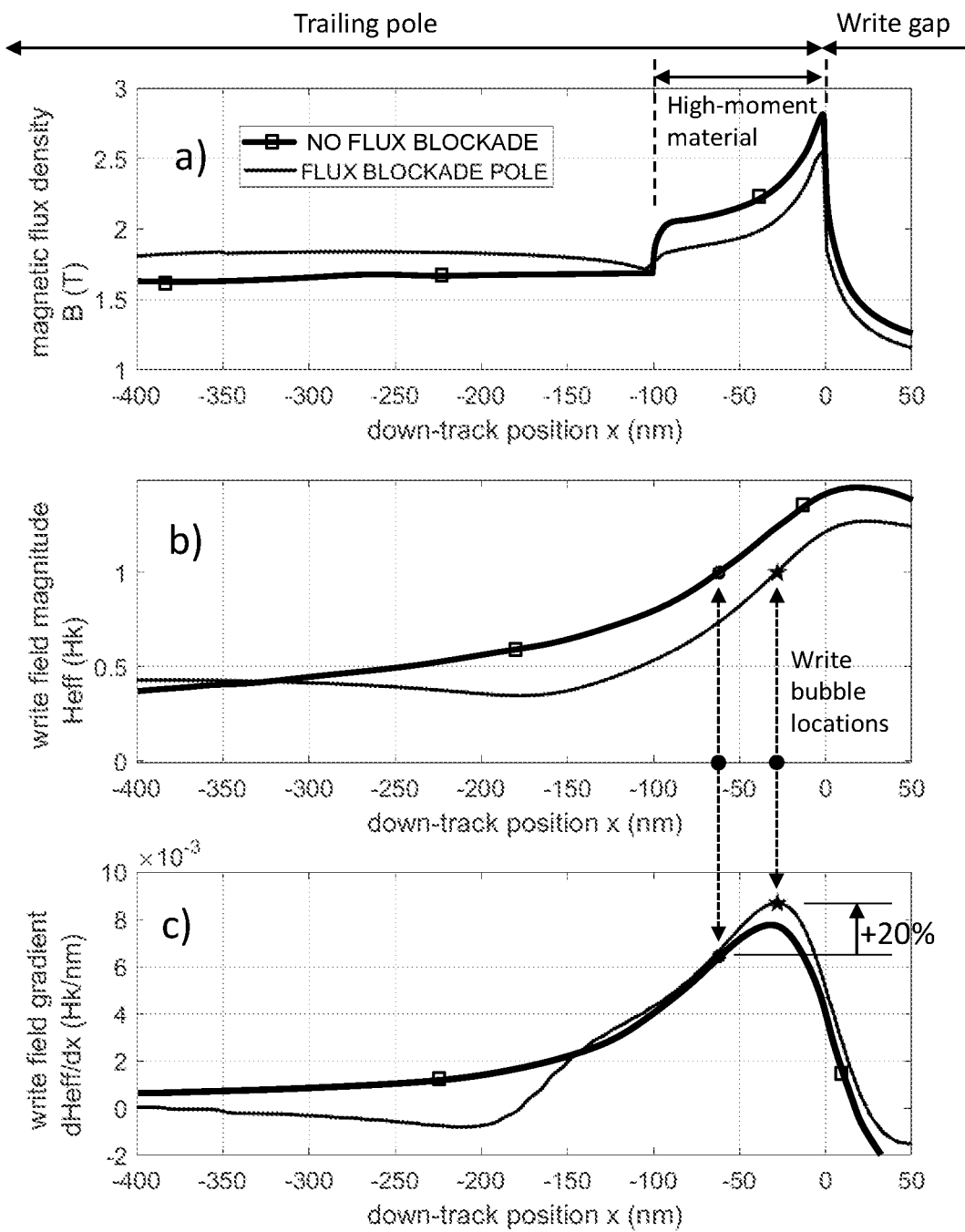
FIG. 13 is a series of charts depicting profiles of magnetic flux density, write field magnitude, and write field gradient, respectively.
Figure 14:
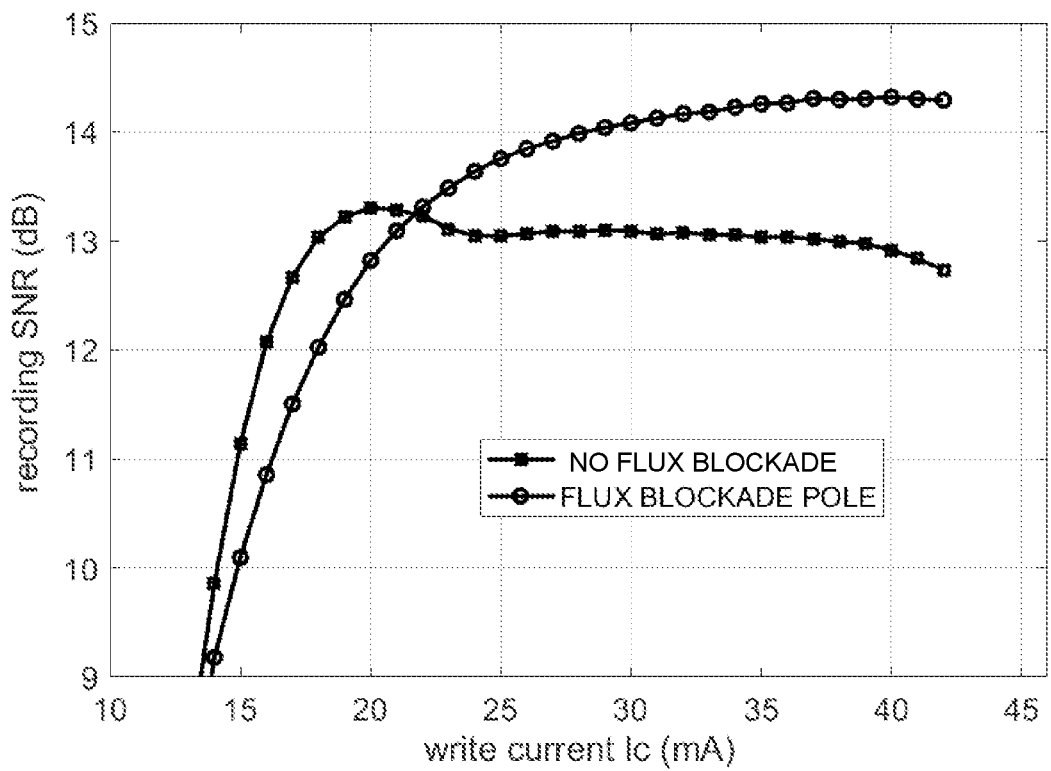
FIG. 14 is a chart depicting saturation curves.
Figure 15:
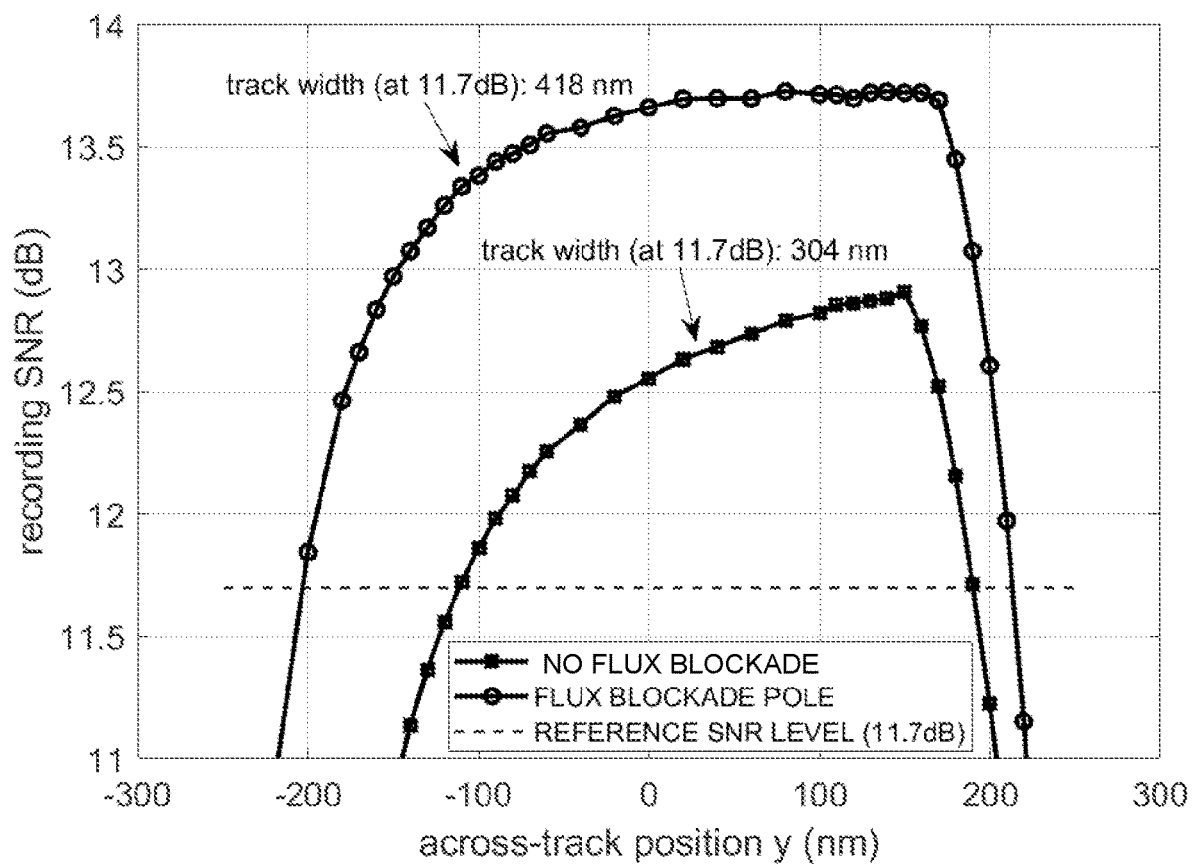
FIG. 15 is a chart depicting track profiles.

FIGS. 13-15 substantiate, using finite-element calculations, the recording improvements achievable by use of the flux blockade structure, as compared to an otherwise identical writer having an upper writer pole structure without the flux blockade structure under otherwise identical conditions. The exemplary writers used to create the depicted data were substantially similar and akin to the embodiment depicted in FIG. 10, with the differences noted below in Table 1.

TABLE 1

| Part/Dimension | Conventional Pole | Flux Blockade Pole |
|---|---|---|
| h1 | 5.0 microns | 0.44 microns |
| t1 | 0 | 0.35 microns |

FIG. 13 part a) shows profiles of the magnetic flux density in the trailing pole, line-sampled in the down-track direction along the tape-bearing surface, and at a lateral position corresponding to the center of the writer. Parts b) and c) are parallel line samples, taken 40 nm away from the TBS at a location coinciding roughly with the mid-thickness of the magnetic layer of tape media, of the effective write field magnitude and of its gradient, respectively. This figure illustrates how the flux blockade modifies the profile of the saturation (i.e., the magnitude B of the magnetic flux density field) generated in the pole, decreases the size of the write bubble, and yet enhances the gradient as well as improving colocation such that writing occurs in this case with about 20% stronger gradients. Gradients directly affect the ability to write abrupt transitions in media, and thus stronger gradients improve write quality.

The saturation curves shown in FIG. 14 show how the enhanced write gradients typically come to bear beyond a threshold write current (at around 22 mA in this example), and results in improved recording SNR performance. In essence, the chart provides a measure of how well each writer writes as a function of the drive current being used to drive the writer. And typically, as the drive current is increased during writing, the resulting SNR increases until the write poles become saturated, and then the SNR tends to flatten out. The higher the SNR, the better the write performance or write quality. As shown, higher SNR, and thus better write quality is achievable using the flux blockade pole than the conventional pole, albeit at the cost of slightly higher drive current, which is acceptable.

FIG. 15 compares track profiles calculated via modeling for a conventional writer and a flux blockade writer of similar construction except for the flux blockade portion in the flux blockade writer, and under otherwise identical conditions (which are also consistent with those used to produce FIG. 13), an operating write current of 25 mA, an assumed shingled-down track width of 600 nm, and a reader width of 200 nm. In this example, a shingled track is formed by performing a first pass of the writer in which the left (negative direction) edge of the writer is positioned at −300 nm in the across-track position y and data is written as the tape is streamed over the head. The tape is then rewound, and the writer is moved one track pitch to the right so the left edge of the writer is at y position +300 nm. Then a second pass track is written that partially overlaps, i.e., shingles, the track written in the first pass. The part of the track written in the first pass that remains after this second pass track has been written is referred to as a shingled track. The SNR of the shingled track is calculated versus cross track position y, for an ideal (uniform response across the width of the reader) 200 nm wide reader. The recording SNR is calculated at stepped y positions plotted to construct the profiles in FIG. 15. In the example shown, assume that a usable SNR level is 11.7 dB, and so the writing should provide an SNR above that level. As shown in FIG. 15, the flux blockade writer provides not only a higher SNR, but also a much wider track width profile. The improvement in SNR performance combined with the flatter shape of the profile from the flux blockade writer result in an overall increase of the tracking margin (or "usable track width") of over 110 nm, which is a substantial improvement. Note that the flux blockade pole achieves similar width increase over the conventional pole if one compares the −0.5 dB drop over the maximum SNR for either design. For example, if a −0.5 dB drop from the maximum determines the width of the written track, then the conventional pole yields a written track width of ~218 nm versus 317 nm for the flux blockade pole. Furthermore, the simulations indicate an improvement in the peak SNR of ~0.8 dB for the flux blockade design over the conventional design.

Note that the modeling emulates the process of writing shingled tracks, as described above. The residual track which is left after shingling is characterized by the left side which was written by the left edge of the writer and the right side of the track which was written by the central region of the writer, but subsequently became the right side of the track after the shingling process. Because of the nature of the fields produced by the head, the left side of the shingled track that was written by the edge of the writer is of poorer quality that degrades toward the track edge and hence exhibits lower SNR than the right side of the track which was written by the central part of the writer. Thus, the written profile is asymmetric in FIG. 15. Nonetheless, with the flux blockade design, the SNR is higher, and the track profile is wider and flatter at the top, as compared to conventional writer design, which is a great improvement.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for performing operations on a magnetic recording tape, the apparatus comprising:
   a magnetic head having an array of writers, each writer having a trailing pole piece positioned between a leading pole piece and an upper yoke, the trailing pole piece having a portion adjacent a write gap,
   the portion of the trailing pole piece having a throat height (h1) of between about 100 and about 800 nm, and an aspect ratio of thickness/throat height (t1/h1) in a range of 0.5 and 2,
   the portion of the trailing pole piece having a higher-moment region adjacent to the write gap of thickness (t2),
   wherein the leading pole piece has a throat height dimension (h2) that is greater than the throat height (h1) of the trailing pole piece,
   wherein the leading pole piece has a portion having a higher-moment region adjacent to the write gap of thickness (t4),
   wherein the higher-moment region of the portion of the leading pole piece is formed of a material having a higher magnetic moment than the material of a remainder of the leading pole piece,
   wherein t4 is greater than t2.

2. An apparatus as recited in claim 1, wherein t2 is at least 50 nm, wherein the higher-moment region of the trailing pole piece is formed of a material having a higher magnetic moment than the material of a remainder of the portion of the trailing pole piece.

3. An apparatus as recited in claim 2, wherein the material of the higher-moment region of the trailing pole piece has a value of saturation magnetization of at least 1.9 T.

4. An apparatus as recited in claim 1, wherein the portion of the trailing pole piece has a width (w2) as measured in a cross-track direction that is constant along the trailing pole piece in a direction of media motion relative to the trailing pole piece for a distance (t3), wherein t3 is greater than or equal to t1.

5. An apparatus as recited in claim 1, wherein the trailing pole piece includes a flare-out extending in a cross-track direction, lower surfaces of the flare-out being oriented at an angle (a1) from the cross-track direction, the angle (a1) being in a range of from 0 to about 60 degrees.

6. An apparatus as recited in claim 5, wherein a distance (t3) from an edge of the trailing pole piece closest to the write gap and the flare-out is equal to the thickness (t1) of the portion of the trailing pole piece.

7. An apparatus as recited in claim 5, wherein a distance (t3) from an edge of the trailing pole piece closest to the write gap and the flare-out is greater than the thickness (t1) of the portion of the trailing pole piece.

8. An apparatus as recited in claim 1, further comprising:
   a drive mechanism for passing the magnetic recording tape over the array of writers; and
   a controller electrically coupled to the writers.

9. An apparatus as recited in claim 1, wherein the portion of the leading pole piece has about a constant width, as measured in a cross-track direction, along an entire thickness (t5) of the portion of the leading pole piece.

10. An apparatus as recited in claim 9, wherein t4 is less than t5.

11. An apparatus for performing operations on a magnetic recording tape, the apparatus comprising:

a magnetic head having an array of writers, each writer having a trailing pole piece positioned between a leading pole piece and an upper yoke, the trailing pole piece having a portion adjacent to and extending from a write gap, the portion of the trailing pole piece having a throat height (h1) that is about constant along an entire thickness (t1) of the portion of the trailing pole piece in a direction of media motion relative to the trailing pole piece from the write gap to a notch in the trailing pole piece, the portion of the trailing pole piece having an aspect ratio of thickness/throat height (t1/h1) in a range of 0.5 and 2, wherein the trailing pole piece includes a flare-out extending in a cross-track direction, lower surfaces of the flare-out being oriented at an angle (a1) from the cross-track direction, the angle (a1) being in a range of from 0 to about 60 degrees, the flare out being located a distance(t3) from the write gap;

wherein the leading pole piece has a throat height dimension (h2) that is greater than h1, and wherein the portion of the trailing pole piece has a width (w2) as measured in a cross-track direction that is about constant along the trailing pole piece in the direction of media motion relative to the trailing pole piece for the distance t3.

12. An apparatus as recited in claim 11, wherein the angle (a1) is 0 degrees.

13. An apparatus as recited in claim 11, wherein the angle (a1) is greater than 0 degrees.

14. An apparatus as recited in claim 11, wherein t3 is equal to t1.

15. An apparatus as recited in claim 11, wherein t3 is greater than t1.

16. An apparatus as recited in claim 11, further comprising:

a drive mechanism for passing the magnetic recording tape over the writers; and a controller electrically coupled to the writers.

17. An apparatus as recited in claim 11, wherein the leading pole piece has a higher-moment region adjacent to the write gap of thickness (t4), wherein the trailing pole piece has a higher-moment region adjacent to the write gap of thickness (t2), wherein the higher-moment region of the leading pole piece is formed of a material having a higher magnetic moment than the material of a remainder of the leading pole piece, wherein the higher-moment region of the trailing pole piece is formed of a material having a higher magnetic moment than the material of a remainder of the trailing pole piece, wherein t4 is greater than t2.

* * * * *